May 27, 1930.  T. H. STRACHAN  1,760,611
SCALE
Filed July 3, 1925   3 Sheets-Sheet 1
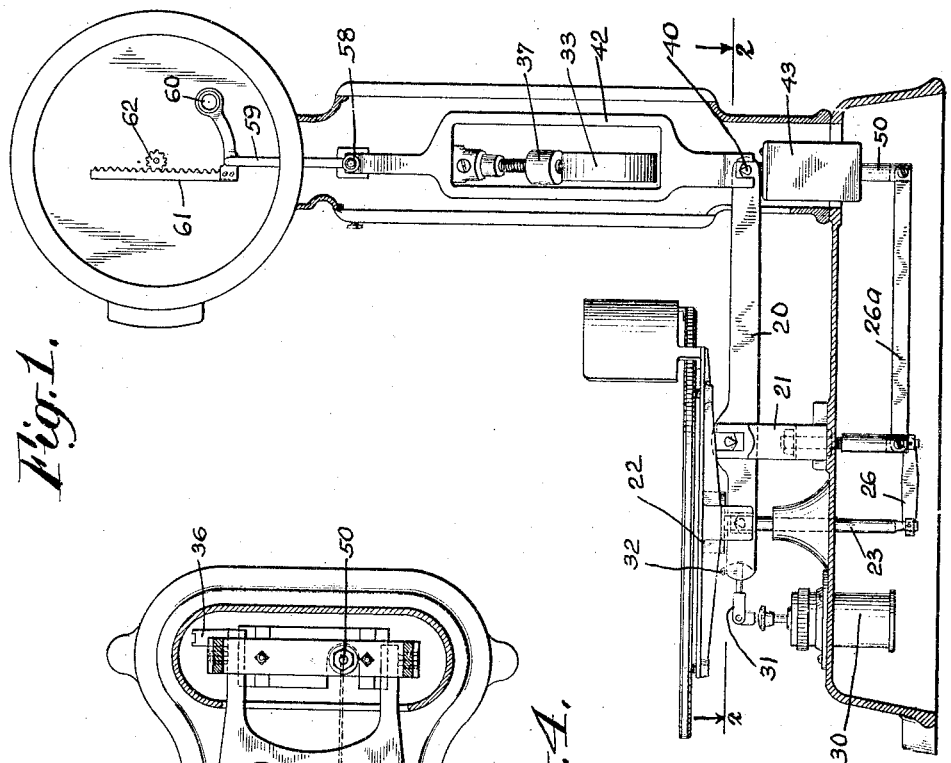
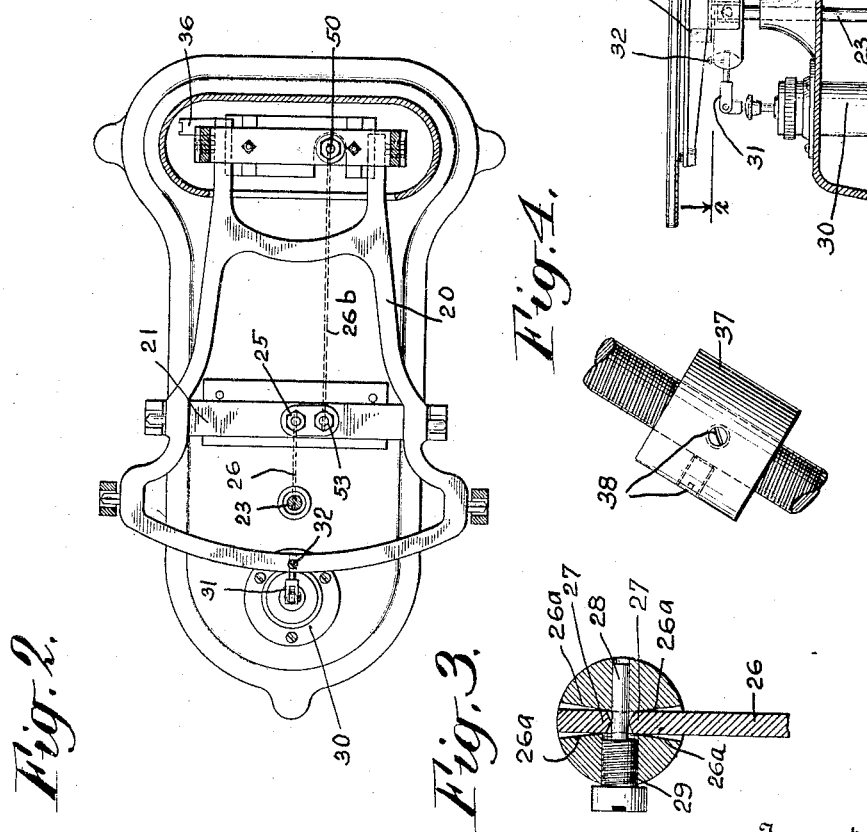
Inventor
Thomas H. Strachan
By his Attorneys
Cooper, Kerr & Dunham

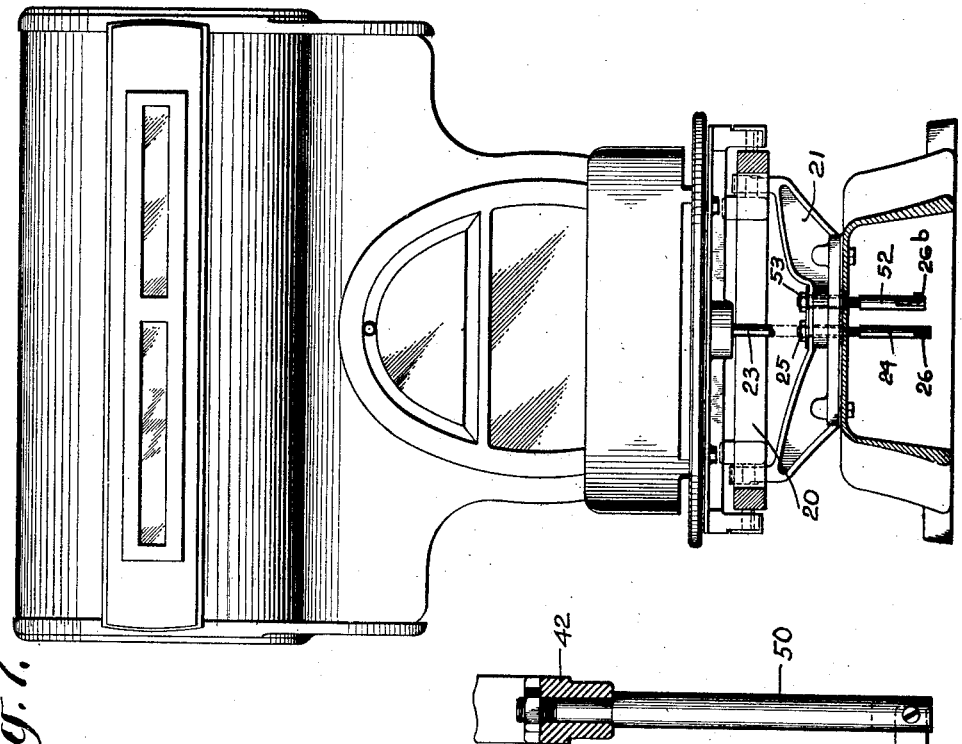
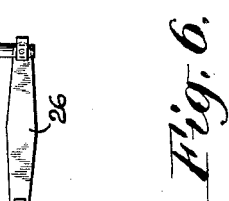
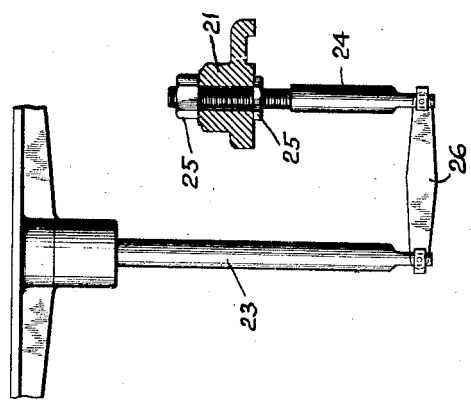

May 27, 1930.　　　T. H. STRACHAN　　　1,760,611
SCALE
Filed July 3, 1925　　　3 Sheets-Sheet 3
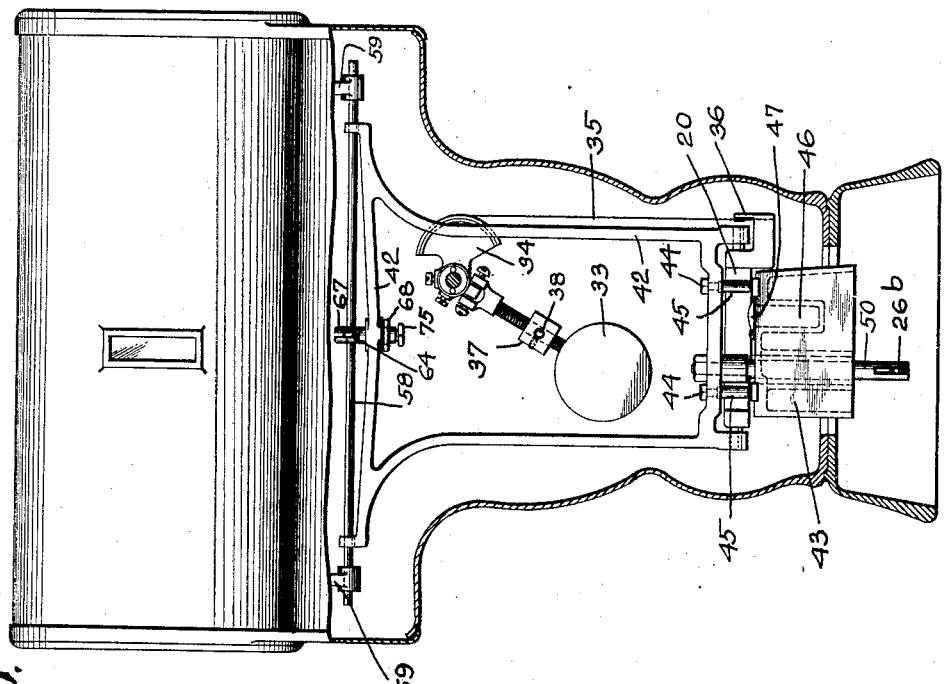
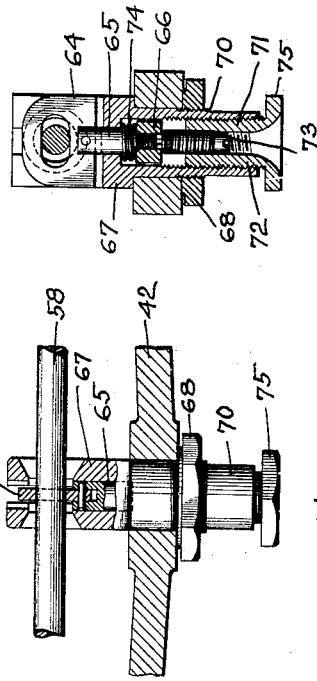
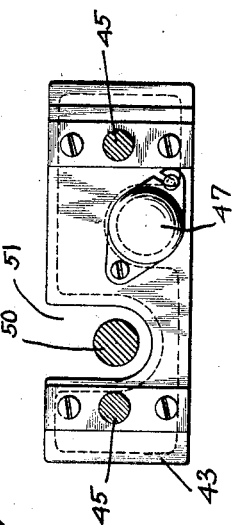
Inventor
Thomas H. Strachan
By his Attorneys
Cooper, Kerr & Dunham Patented May 27, 1930

1,760,611

UNITED STATES PATENT OFFICE

THOMAS H. STRACHAN, OF DAYTON, OHIO, ASSIGNOR TO DAYTON SCALE COMPANY, OF DAYTON, OHIO, A CORPORATION OF NEW JERSEY

SCALE

Application filed July 3, 1925. Serial No. 41,283.

This invention relates to improvements in weighing scales and more particularly to improvements of the scale described in the patent to Joseph Hopkinson, No. 1,316,576.

The invention has for its objects the provision of certain improvements in the above mentioned scale to the general end that the scale will be more efficient in its operation and be easier to manufacture and seal.

A further object of the present invention resides in the provision of suitable means for stabilizing the swinging movement of the vertical frame which actuates the racks. For this purpose check members are provided which constitute a parallel motion to keep the vertical frame in a substantially vertical position.

Other objects of the present invention reside in the provision of a simpler zero adjustment device; the provision of a supplementary adjusting weight on the pendulum stem; the provision of an improved dash pot construction which operates in reverse direction to the dash pot heretofore employed and the provision of base lever check instead of overhead check as heretofore.

In the drawings,

Fig. 1 is a side elevational view of the scale with the base and certain parts shown in section to show the interior construction.

Fig. 2 is a detail top view taken partly in section, the view being taken on line 2—2 of Fig. 1.

Fig. 3 is a detail view showing the check pivot construction.

Fig. 4 is a detail view of the adjusting weight of the pendulum stem.

Fig. 5 is a detail view of the platform check.

Fig. 6 is a detail view of the vertical check.

Fig. 7 is a front view of the complete scale with certain parts shown in section to show the interior construction.

Fig. 8 is a rear view of the scale.

Fig. 9 is a detail partly sectionalized view of the zero adjustment device.

Fig. 10 is a sectional view of the parts shown in Fig. 9, the section being taken on line 10—10 of Fig. 9.

Fig. 11 is a detail top plan view of the counter-weight box.

In more detail in the drawings, 20 is the main scale lever supported in the usual way on bearings carried by fulcrum stand 21. The platform bearing frame 22 is supported in the usual way upon the lever load pivots and this platform carries a check stem 23 extending into the base of the scale. A check post 24 (Fig. 5) is adjustably supported in the fulcrum stand 21. Preferably to adjust the position of the check post 24 nuts 25 are provided. A check link 26 pivotally connects posts 23 and 24. The arrangement of the pivots is preferably that shown in Fig. 3. Here the post is shown provided with bevel surfaces 26$^a$ converging together and the check link 26 is apertured and provided with pointed portions 27 cooperating with the stud 28 which is enlarged at 29 and threaded to fit in threads in the check post.

To dampen the oscillations of the weighing mechanism a dash pot 30 (Fig. 1) is provided. This dash pot is provided with the usual plunger construction and its plunger or piston rod is preferably connected to a member 31 which is adjustably secured at the end of the lever 20 by a set screw 32. The dash pot 30 being located at the left of the fulcrum of the beam is so placed that the piston will descend upon an application of a load to the platform instead of ascending as heretofore. This obviates the tendency of the piston to pump the oil out of the dash pot upon the rapid descent of the lever when a load is applied thereto. The dash pot action is furthermore multiplied by reason of part 31 extending to the left of the load pivots.

The load counterbalancing mechanism comprises a descending pendulum 33 provided with an eccentric cam 34 having a cooperating tape 35 connected to the nose portion 36 of the lever 20. In order to facilitate the adjustment of the pendulum load counterbalancing means a supplementary weight 37 is threaded upon the pendulum stem. After the adjustment is secured weight 37 can be locked in position on the pendulum stem by tightening set screws 38 (see Fig. 4). The lever 20 is provided with upwardly facing nose pivots 40 supporting a vertical frame 42. The counter-weight box 43 depends from the frame 42 as best shown in Fig. 8 and is held in position by studs 44 and cooperating spacing collars 45. For a final sealing of the weight of the counter-weight box 43 a shot cup 46 is provided having a displaceable cover 47 (see Fig. 11). This cover may be swung to permit the removal or addition of shot to bring the counter-weight box to the desired weight.

Inasmuch as the vertical frame 42 tends to rock slightly about its supporting pivots 40 during weighing operations and this action, if excessive, would tend to cause an improper drive of the indicating drum provision is made for checking the swinging movement. In place of providing the guide blocks disposed at the upper sides of the vertical frame in the present construction a check construction is employed. Referring to Figs. 8 and 6 it will be noted that a check post 50 is secured to the frame 42 and depends through a clearance notch 51 in the counter-weight box 43 (see Fig. 11). The fulcrum stand 21 also supports a check post 52 suitable adjusting nuts 53 being provided for adjusting the position of post 52. Pivotally connecting the posts 52 and 50 is a check link 26ᵇ. The form of pivot connection employed at the ends of the check links 26ᵃ may be similar to that previously described in connection with link 26. The check construction provides an arrangement for maintaining the vertical frame 42 in substantially vertical position and preventing oscillatory movement of the frame about the pivots 40.

Referring to Fig. 1 it will be noted that check link 26ᵇ in length corresponds to the distance between the nose pivots 40 and the fulcrum pivots and the check link 26 in its effective length corresponds to the distance between the fulcrum pivots and the load pivots.

Extending across under the drum is a cross equalizer bar or rod 58. This bar or rod 58 has pivotally secured thereon rack carriers 59 provided with a comparatively light enmeshing weight 60. The enmeshing weight 60 may be cored out for lightness. The racks 61 operate the drum pinions 62 in the usual manner. To provide for a simple adjustment of the scale provision is made for adjusting the position of rod 58 relative to vertical frame 42. Referring to Figs. 9 and 10 a slotted plate 64 is provided which receives the cross rod 58. Plate 64 is pinned to a stud 65, which stud at its end is reduced and threaded to receive a collar 66. The stud slidably fits in a member 67 which is secured in frame 42 in any suitable manner as by a nut 68. The interior member 67 is threaded as shown at 70 to receive a member 71 interiorly threaded at 72 and receiving an adjusting screw 73. By first locating 71 at the proper position in member 67 and thereafter tightening up upon set screws 73 to the desired extent the plunger 65 and rod 58 may be vertically adjusted relative to frame 42. If it is desired to adjust in the opposite direction set screw 73 is loosened whereupon a coil spring 74 will draw down upon plunger 65 and the parts carried thereby. For convenience in adjusting the set screw carrier 71 the end of this carrier is provided with hexagonal nut 75.

I claim:

1. A weighing scale comprising a rotatable indicator, a lever, an indicator driving frame pivotally supported on said lever and carrying gear means for rotating said indicator in both directions, and a check device for preventing excessive oscillations of said frame and erroneous movements of the indicator obtained from said excessive oscillations.

2. A weighing scale comprising a scale lever, a rotatable indicator, an indicator driving frame having a pivotal support upon said lever and having a counterweighted part below the pivotal support of greater weight than the part of the frame upon the pivot to normally retain said frame in vertical position, and means comprising a parallel motion for preventing swinging of the frame and the imparting of the erroneous rotary movement to the indicator.

3. A weighing scale having an indicator, a fulcrumed scale lever, a platform pivotally supported thereon, an indicator driving frame pivotally supported thereon and having means for positively imparting rotation to said indicator in either direction, check means for maintaining the platform horizontal, and check means for maintaining the indicator driving frame vertical and for preventing such tilting movements of the frame which would impart relative rotatable movement to the indicator which is positively driven from said frame.

4. The invention set forth in claim 3 in which means are provided for independently adjusting either of the check means to bring the same into parallelism with the lever, said adjusting means being adapted to vary the distance of one end of the check from said lever while maintaining the check length.

5. A weighing scale comprising a scale lever, a vertical frame pivotally supported thereon and counterweighted below the pivotal support, and a check means for said frame to maintain the same substantially in vertical position.

6. The invention set forth in claim 5 in which the scale is provided with a frame and in which the check means comprises a post depending from said frame, a second post depending from and adjustable relative to the frame of the scale, and a check link pivotally connected with each of the aforesaid posts.

7. A weighing scale comprising a scale lever, an indicator driving frame pivotally supported thereon, a counterweight for said frame disposed below the pivotal support thereof, and a supplemental shot cup in said main counterweight adapted to receive variable amounts of shot for sealing the scale.

8. A weighing scale having an indicator driving frame, an equalizer rod carried thereby, a zero adjustment for varying the relation of said rod and frame, said adjustment device comprising a plate-like member slotted to receive the equalizer rod, a plunger connected therewith and vertically guided in a member carried by said frame, a spring for urging said plate and plunger in one direction, and a set screw bearing upon the end of said plunger for adjusting the same in the opposite direction.

9. A check for a weighing scale comprising a check post, a check link of plate-like form, said link being provided with a pivot opening, said pivot opening having a pointed annular bearing for the purpose described.

In testimony whereof I hereto affix my signature.

THOMAS H. STRACHAN.